(12) United States Patent
Feng et al.

(10) Patent No.: US 12,189,842 B2
(45) Date of Patent: Jan. 7, 2025

(54) DISPLAY DEVICE, WEARABLE DISPLAY DEVICE AND METHOD FOR DETERMINING GAZE POSITIONS

(71) Applicant: BOE Technology Group Co., Ltd., Beijing (CN)

(72) Inventors: Xuan Feng, Beijing (CN); Lei Wang, Beijing (CN); Yapeng Li, Beijing (CN); Ping Zhang, Beijing (CN); Wenhao Tian, Beijing (CN); Yunke Qin, Beijing (CN); Jiabin Wang, Beijing (CN); Yangbing Li, Beijing (CN); Chengfu Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/794,814

(22) PCT Filed: May 27, 2021

(86) PCT No.: PCT/CN2021/096407
§ 371 (c)(1),
(2) Date: Jul. 22, 2022

(87) PCT Pub. No.: WO2022/246740
PCT Pub. Date: Dec. 1, 2022

(65) Prior Publication Data
US 2024/0192769 A1   Jun. 13, 2024

(51) Int. Cl.
*G06K 9/00*   (2022.01)
*G02B 27/00*   (2006.01)
(Continued)

(52) U.S. Cl.
CPC ............ *G06F 3/013* (2013.01); *G06F 3/0325* (2013.01)

(58) Field of Classification Search
CPC .................................................. G02B 27/0172
See application file for complete search history.

(56) References Cited

U.S. PATENT DOCUMENTS

2007/0273778 A1 * 11/2007 Hsu .................. H04N 17/02
                                                      345/87
2010/0299642 A1    11/2010 Merrell et al.
(Continued)

FOREIGN PATENT DOCUMENTS

CN      104238923 A      12/2014
CN      107248519 A      10/2017
(Continued)

*Primary Examiner* — Nan-Ying Yang
(74) *Attorney, Agent, or Firm* — IPro, PLLC (57) ABSTRACT

Provided is a display device including a display panel and a plurality of photoelectric sensor assemblies. The display panel includes a display region, a first region disposed outside the display region and extending along a first direction, and a second region disposed outside the display region and extending along a second direction, wherein the first direction is intersected with the second direction. Each of the photoelectric sensor assemblies is provided with a strip-shaped photosensitive region. One portion of the plurality of photoelectric sensor assemblies are disposed in the first region, the other portion of the photoelectric sensor assemblies are disposed in the second region. Each of the photoelectric sensor assemblies is configured to receive an optical signal reflected via eyes of a user and convert the optical signal into an electric signal.

18 Claims, 6 Drawing Sheets

(51) Int. Cl.
     *G02B 27/01*      (2006.01)
     *G06F 3/01*       (2006.01)
     *G06F 3/03*       (2006.01)

(56) References Cited

U.S. PATENT DOCUMENTS

| | | | |
|---|---|---|---|
| 2013/0050642 A1* | 2/2013 | Lewis | A61B 3/113 351/204 |
| 2016/0035310 A1 | 2/2016 | Song et al. | |
| 2017/0091549 A1* | 3/2017 | Gustafsson | G06F 3/012 |
| 2018/0225511 A1 | 8/2018 | Gustafsson et al. | |
| 2021/0223458 A1 | 7/2021 | Zou et al. | |

FOREIGN PATENT DOCUMENTS

| | | |
|---|---|---|
| CN | 108363522 A | 8/2018 |
| CN | 108604116 A | 9/2018 |
| CN | 109656421 A | 4/2019 |
| CN | 113325572 A | 8/2021 |
| CN | 113325573 A | 8/2021 |
| CN | 113325585 A | 8/2021 |
| CN | 113325953 A | 8/2021 |

\* cited by examiner

DISPLAY DEVICE, WEARABLE DISPLAY DEVICE AND METHOD FOR DETERMINING GAZE POSITIONS

CROSS-REFERENCE TO RELATED APPLICATION

The present disclosure is a U.S. national stage of international application No. PCT/CN2021/096407, filed on May 27, 2021, the content of which is herein incorporated by reference in its entirety.

TECHNICAL FIELD

The present disclosure relates to the field of virtual display technologies, and in particular, relates to a display device, a wearable display device, and a method for determining gaze positions.

BACKGROUND

A virtual reality (VR) device refers to a device that is capable of creating a virtual environment based on displayed images and exerting an immersive feeling for the user in the virtual environment.

SUMMARY

Embodiments of the present disclosure provide a display device, a wearable display device, and a method for determining gaze positions.

In one aspect of the embodiments of the present disclosure, a display device is provided. The display device includes:
- a display panel, including a display region, a first region disposed outside the display region and extending along a first direction, and a second region disposed outside the display region and extending along a second direction, wherein the first direction is intersected with the second direction; and
- a plurality of photoelectric sensor assemblies, each of the photoelectric sensor assemblies being provided with a strip-shaped photosensitive region; wherein one portion of the plurality of photoelectric sensor assemblies are disposed in the first region, extension directions of photosensitive regions of the portion of the photoelectric sensor assemblies being parallel to the second direction; the other portion of photoelectric sensor assemblies are disposed in the second region, extension directions of photosensitive regions of the other portion of the photoelectric sensor assemblies being parallel to the first direction; and each of the photoelectric sensor assemblies is configured to receive an optical signal reflected via eyes of a user and convert the optical signal into an electric signal.

Optionally, the photoelectric sensor assemblies within the first region and the second region are arranged in rows.

Optionally, the photoelectric sensor assemblies are arranged in two rows in each of the first region and the second region along a direction away from the display region, and the two rows of photoelectric sensor assemblies are staggered.

Optionally, in the two rows of photoelectric sensor assemblies, a length of a photosensitive region of a first photoelectric sensor assembly is greater than a length of a photosensitive region of a second photoelectric sensor assembly, wherein the first photoelectric sensor assembly is any one of a row, distal from the display region, of photoelectric sensor assemblies, and the second photoelectric sensor assembly is any one of a row, proximal to the display region, of photoelectric sensor assemblies.

Optionally, a ratio of the length of the photosensitive region of the first photoelectric sensor assembly to the length of the photosensitive region of the second photoelectric sensor assembly ranges from 1.1 to 2.

Optionally, the photosensitive region of each of the photoelectric sensor assemblies is trapezoidal;
wherein in the two rows of photoelectric sensor assemblies, an upper base of a photosensitive region of any one of the row, distal from the display region, of photoelectric sensor assemblies is collinear with an upper base of a photosensitive region of any one of the row, proximal to the display region, of photoelectric sensor assemblies.

Optionally, the photosensitive region of each of the photoelectric sensor assemblies is rectangular.

Optionally, in a same row of the photoelectric sensor assemblies, areas of the photosensitive regions of the plurality of photoelectric sensor assemblies progressively decrease in a direction from both ends to a center.

Optionally, in a same row of the photoelectric sensor assemblies, areas of the photosensitive regions of the photoelectric sensor assemblies are equal.

Optionally, in a same row of the photoelectric sensor assemblies, distances between any two adjacent photoelectric sensor assemblies are equal.

Optionally, the display device further includes an optical structure disposed on a side, distal from the display panel, of the photoelectric sensor assemblies, wherein the optical structure includes a light shielding region, and a plurality of light transmitting regions corresponding to the first region and the second region, an orthographic projection of each of the light transmitting regions on the display panel being within a corresponding first region or second region;
wherein each of the photoelectric sensor assemblies is configured to receive the optical signal reflected via the eyes of the user and transmitted through the light transmitting region in the optical structure, and convert the optical signal into the electric signal.

Optionally, the display device further includes a processing circuit connected to each of the photoelectric sensor assemblies, wherein the processing circuit is configured to determine a gaze position of the eyes of the user on the display panel based on a signal value of the electric signal transmitted by each of the photoelectric sensor assemblies, a position of the photoelectric sensor assembly within the first region, and a position of the photoelectric sensor assembly within the second region.

Optionally, the display device further includes a control circuit; wherein each of the photoelectric sensor assemblies includes: a switch transistor and a photodiode;
wherein the photodiode includes: a substrate, and a pixel electrode, a P-type material layer, a photosensitive material layer, an N-type material layer, and a common electrode that are disposed on a side of the substrate, and are successively stacked along a direction away from the substrate;
wherein a first electrode of the switch transistor is electrically connected to the pixel electrode, a second electrode of the switch transistor is electrically connected to the processing circuit, a control electrode of the switch transistor is electrically connected to the control circuit, and the control circuit is configured to control on and off of the switch transistor.

In another aspect of the embodiments of the present disclosure, a wearable display device is provided. The wearable display device includes: a display device as defined above, a lens disposed on a display side of a display device, and a plurality of light-emitting elements disposed on an edge of the lens;

wherein emitting directions of the plurality of light-emitting elements face away from the display device.

In still another aspect of the embodiments of the present disclosure, a method for determining gaze positions is provided, which is applicable to the display device as defined above. The method includes:

receiving a first electric signal transmitted by the photoelectric sensor assembly within the first region, wherein the first electric signal is converted, by the photoelectric sensor assembly within the first region, from a first optical signal reflected via the eyes of the user;

receiving a second electric signal transmitted by the photoelectric sensor assembly within the second region, wherein the second electric signal is converted, by the photoelectric sensor assembly within the second region, from a second optical signal reflected via the eyes of the user; and determining the gaze position of the eyes of the user on the display panel based on the first electric signal and the second electric signal.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

The terms used in the detailed description of the present disclosure are merely for interpreting, instead of limiting, the embodiments of the present disclosure. It should be noted that unless otherwise defined, technical or scientific terms used in the embodiments of the present disclosure shall have ordinary meanings understandable by persons of ordinary skill in the art to which the disclosure belongs. The terms "first," "second," and the like used in the embodiments of the present disclosure are not intended to indicate any order, quantity or importance, but are merely used to distinguish the different components. The terms "comprise." "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under." "left," and "right" are only used to indicate relative positional relationships. When the absolute position of the described object changes, the relative positional relationship may change accordingly.

In the related art, the VR device includes a display panel, a camera, a processor, and a drive circuit. The camera is configured to capture images of eyes of a user. The processor determines a gaze position of the user on the display panel according to the image of the eyes of the user, and partially renders an image to be displayed according to the gaze position. The drive circuit drives, based on the received partially rendered display image transmitted by the processor, the display panel to display. Because the processor may only partially render a region where the gaze position in the display image is disposed, and does not need to globally render the display image, therefore, not only a load of the processor may be reduced, but also a display effect of the display panel may be ensured.

However, in the related art, the processor has a less efficiency in determining the gaze position according to the image of the eyes taken by the camera, thereby resulting in a lower display efficiency of the display panel.

Figure 1:
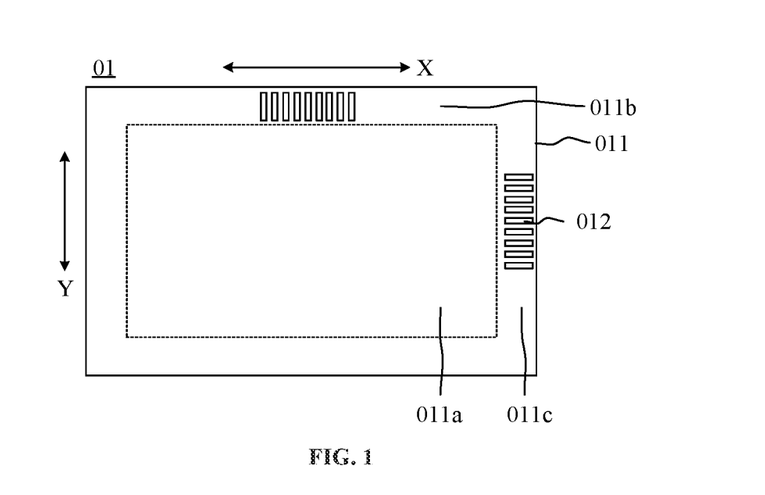
FIG. 1 is a schematic structural diagram of a display device according to an embodiment of the present disclosure.

FIG. 1 is a schematic structural diagram of a display device according to an embodiment of the present disclosure. Referring to FIG. 1, the display device 01 may include: a display panel 011 and a plurality of photoelectric sensor assemblies 012.

The display panel 011 includes a display region 011a, a first region 011b disposed outside the display region Olla and extending along a first direction X. and a second region 011c disposed outside the display region Olla and extending along a second direction Y. The first direction X is intersected with the second direction Y.

Each of the photoelectric sensor assemblies 012 is provided with a strip-shaped photosensitive region. One portion of the plurality of photoelectric sensor assemblies 012 is disposed in the first region 011b, and extension directions of the photosensitive regions of the portion of the photoelectric sensor assemblies 012 are parallel to the second direction Y. The other portion of the plurality of photoelectric sensor assemblies 012 is disposed in the second region 011c, and extension directions of the photosensitive regions of this portion of the photoelectric sensor assemblies 012 are parallel to the first direction X.

Each of the photoelectric sensor assemblies 012 is configured to receive an optical signal reflected via the eyes of a user, and convert the optical signal into an electric signal.

In the embodiments of the preset disclosure, positions of the photoelectric sensor assemblies 012 may be pre-stored in the display device 01. Because different regions of the human eye have different reflectivities to light (e.g., infrared light), optical signals, reflected via different regions in the human eye, which are received by the photoelectric sensor assembly 012 are different. Signal values of the electric signals converted by the photoelectric sensor assembly 012 based on different optical signals are thus also different. In this way, the display device 01 may determine a gaze position of the eyes of the user on the display panel 011 based on the signal value of the electric signal and the position of the photoelectric sensor assembly 012.

In the related art, a camera is generally employed to image the eyes of the user, and the display device determines gaze positions according to the image of the eyes of the user. However, in the case that the camera is employed to image the eyes of the user, the display device needs to process the data of each pixel in the image of the eye of the user. Because a data amount is large, it takes time to determine the gaze position of the eyes of the user on the display panel.

However, in the embodiments of the present disclosure, because the photosensitive region of each of the photoelectric sensor assemblies 012 is stripe-shaped, and the plurality of photoelectric sensor assemblies 012 within the first region 011b may receive first optical signals reflected via the eyes of the user, wherein the first optical signal is a slice, in the second direction Y. of the optical signals reflected via different regions in the eye of the user; and may convert the first optical signal reflected via the eyes of the user into a first electric signal. The plurality of photoelectric sensor assemblies 012 within the second region 011c may receive a second optical signal reflected via the eyes of the user, wherein the second optical signal is a slice, in the first direction X. of the optical signals reflected via different regions in the eyes of the user; and may convert the second optical signal reflected via the eyes of the user into a second electric signal. Therefore, the display device 01 only needs to process pixels in the first direction X and the second direction Y. and thus the data amount is small. That is, the display device 01 has a high efficiency in processing an electric signal transmitted by each of the photoelectric sensor assemblies 012 and is capable of quickly determining the gaze position of the eyes of the user on the display panel 011. In this way, the efficiency of displaying images on the display panel 011 is further improved, and thus a higher refresh rate of the display panel 01 is achieved.

Moreover, because the plurality of photoelectric sensor assemblies 012 are within the first region 011b of the display panel 011, normal display of the display panel 011 is not affected by the plurality of photoelectric sensor assemblies 012, and thus, the display effect of the display panel 011 is great.

In summary, the embodiments of the present disclosure provide a display device. Because the display device has a high efficiency in processing the electric signal transmitted by each of the photoelectric sensor assemblies, the display device is capable of quickly determining the gaze position of the eyes of the user on the display panel based on the electric signal transmitted by each of the photoelectric sensor assemblies. In this way, the efficiency of displaying the images by the display panel is further improved, and thus a higher refresh rate of the display panel is achieved.

In the embodiments of the present disclosure, the photoelectric sensor assemblies 012 in the display device 01 may be arranged in many ways. The embodiments of the present disclosure take the following two arrangement ways as examples for schematic descriptions.

Figure 2:
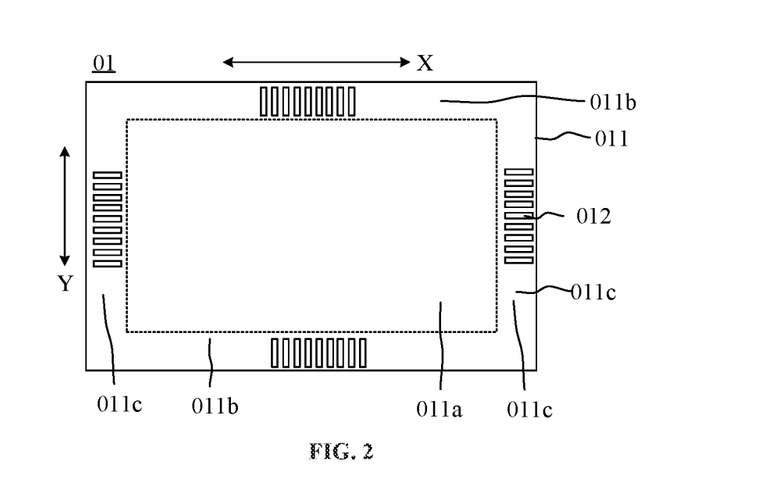
FIG. 2 is a schematic structural diagram of another display device according to an embodiment of the present disclosure.

In a first arrangement, referring to FIG. 2. FIG. 2 is a schematic structural diagram of another display device according to an embodiment of the present disclosure. The photoelectric sensor assemblies within the first region 011b and the second region 011c are arranged in rows. For example, the plurality of photoelectric sensor assemblies 012 within the first region 011b are arranged in a row along the first direction X. and the plurality of photoelectric sensor assemblies 012 within the second region 011c are arranged in a row along the second direction Y. In this way, the photosensitive regions of the plurality of photoelectric sensor assemblies 012 within the first region 011b may receive the slice, in the second direction Y. of the optical signals reflected via the different regions in the eye of the user, and the photosensitive regions of the plurality of photoelectric sensor assemblies 012 within the second region 011c may receive the slice, in the first direction X, of the optical signals reflected via the different regions in the eye of the user.

Optionally, referring to FIG. 2, the photosensitive region of each of the photoelectric sensor assemblies 012 is rectangular, and a width of the photosensitive region of each of the photoelectric sensor assemblies 012 ranges from 1 to 5 µm. A distance between central lines of the photosensitive regions of any two adjacent photoelectric sensor assemblies 012 ranges from 1 to 10 µm.

Figure 3:
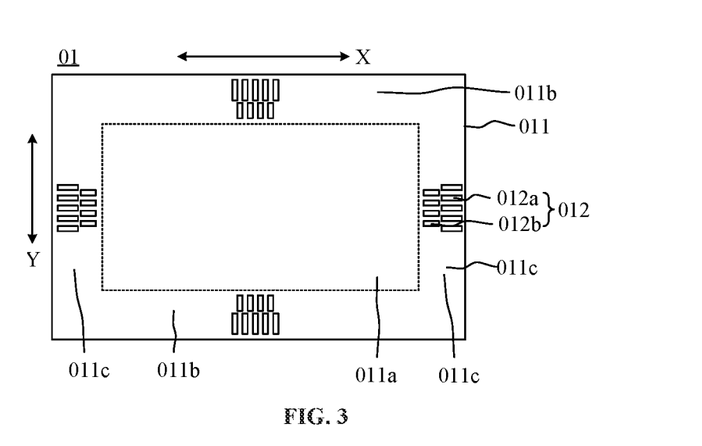
FIG. 3 is a schematic structural diagram of yet another display device according to an embodiment of the present disclosure.

In a second arrangement, referring to FIG. 3, FIG. 3 is a schematic structural diagram of yet another display device according to an embodiment of the present disclosure. The photoelectric sensor assemblies 012 are arranged in two rows in each of the first region 011b and the second region 011c along a direction away from the display region 011a, and the two rows of photoelectric sensor assemblies 012 are arranged in a staggered fashion. For example, the plurality of photoelectric sensor assemblies 012 within the first region 011b are arranged in two rows along the direction away from the display region 0lla, and each row of the photoelectric sensor assemblies 012 are arranged along the first direction X; the plurality of photoelectric sensor assemblies 012 within the second region 011c are arranged in two rows along the direction away from the display region 011a, and each row of the photoelectric sensor assemblies 012 are arranged along the second direction Y. In this way, by arranging the photoelectric sensor assemblies within the first region 011b and the second region 011c in two rows along the direction away from the display region 011a and in a staggered fashion, the distance between the central lines of the photosensitive regions of any two adjacent photoelectric sensor assemblies 012 may be decreased, and thus, an accuracy of determining the gaze positions by the display device 01 is improved.

In the embodiments of the present disclosure, referring to FIG. 3, in the two rows of photoelectric sensor assemblies 012, a first photoelectric sensor assembly 012a is any one of a row; distal from the display region 011a, of photoelectric sensor assemblies 012, and a second photoelectric sensor assembly 012b is any one of a row, proximal to the display region 011a, of photoelectric sensor assemblies 012. Because the first photoelectric sensor assembly 012a is far away from the display region 011a relative to the second photoelectric sensor assembly 012b, that is, the first photoelectric sensor assembly 012a is far away from the eyes of the user relative to the second photoelectric sensor assembly 012b, fewer optical signals reflected via the eyes of the user are received by the first photoelectric sensor assembly 012a, while more optical signals reflected via the eyes of the user are received by the second photoelectric sensor assembly 012b. For ensuring the optical signals, reflected via the eyes of the user, which are received by the first photoelectric sensor assembly 012a and the second photoelectric sensor assembly 012b, are based on the same reference, a length of a photosensitive region of the first photoelectric sensor assembly 012a needs to be greater than a length of a photosensitive region of the second photoelectric sensor assembly 012b.

Optionally, a ratio of the length of the photosensitive region of the first photoelectric sensor assembly 012a to the length of the photosensitive region of the second photoelectric sensor assembly 012b may range from 1.1 to 2.

In the second arrangement, for the shape of the photosensitive region of each of the photoelectric sensor assemblies 012, the embodiments of the present disclosure take the following two cases as examples for a schematic description.

In a first case, referring to FIG. 3, the photosensitive region of each of the photoelectric sensor assemblies 012 may be rectangular, and the width of the photosensitive region of each of the photoelectric sensor assemblies 012 ranges from 1 to 5 µm. The distance between the central lines of the photosensitive regions of any two adjacent photoelectric sensor assemblies 012 ranges from 1 to 10 µm.

Figure 4:
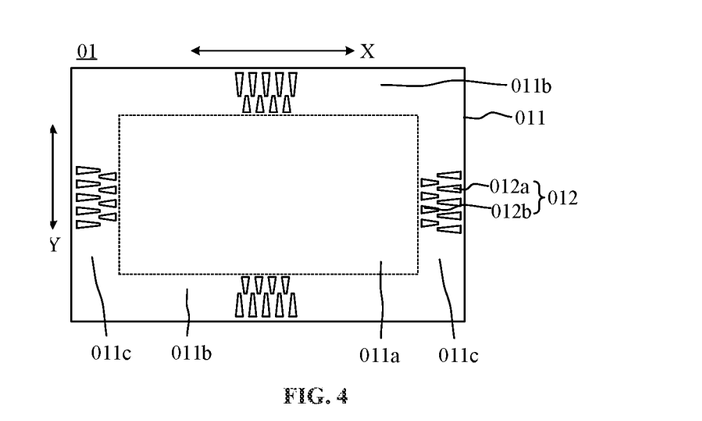
FIG. 4 is a schematic structural diagram of still another display device according to an embodiment of the present disclosure.

In a second case, referring to FIG. 4, FIG. 4 is a schematic structural diagram of still another display device according to an embodiment of the present disclosure. The photosensitive region of each of the photoelectric sensor assemblies 012 may be trapezoidal. In the two rows of photoelectric sensor assemblies 012, an upper base of a photosensitive region of any one of the row; distal from the display region 011a, of photoelectric sensor assemblies 012 is collinear with an upper base of a photosensitive region of any one of the row, proximal to the display region Olla, of photoelectric sensor assemblies 012. In this way, a distance between the two rows of photoelectric sensor assemblies 012 is 0, the photoelectric sensor assembly 012 is wholly proximal to the display region Olla, and the photoelectric sensor assembly 012 may receive more optical signals reflected via the eyes of the user, such that the accuracy of determining the gaze positions is improved.

Optionally, in the case that the photosensitive region of each of the photoelectric sensor assemblies 012 is trapezoidal, a length of an upper base of each of the trapezoids is a minimum process width of the photosensitive region of the photoelectric sensor assembly 012, such that any two adjacent photoelectric sensor assemblies 012 do not interfere each other. The distance between the central lines of the photosensitive regions of any two adjacent photoelectric sensor assemblies 012 ranges from 1 to 10 microns.

In the embodiments of the present disclosure, the areas of photosensitive regions of a same row of the photoelectric sensor assemblies 012 may be defined in multiple configurations. The embodiments of the present disclosure take the following two possible implementation manners as examples for a schematic description.

In a first configuration, referring to FIG. 2 and FIG. 3, in a same row of the photoelectric sensor assemblies 012, the areas of the photosensitive regions of each of the photoelectric sensor assemblies 012 are equal.

Figure 5:
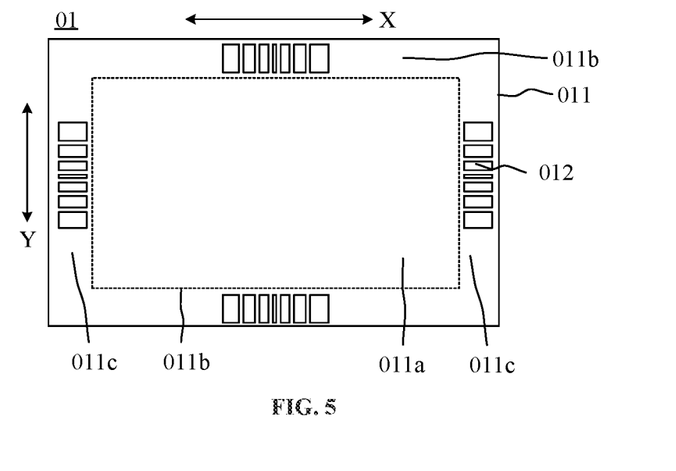
FIG. 5 is a schematic structural diagram of still another display device according to an embodiment of the present disclosure.

In a second configuration, referring to FIG. 5, FIG. 5 is a schematic structural diagram of still another display device according to an embodiment of the present disclosure. In a same row of the photoelectric sensor assemblies 012, the areas of the photosensitive regions of the plurality of photoelectric sensor assemblies 012 progressively decrease in the direction from ends of the photoelectric sensitive regions to a center of the photoelectric sensitive regions. Because the eyes of the user are spherical, the intensities of the optical signals reflected via different regions in the eyes of the user are different. In this way, in the case that the areas of the photosensitive regions of the plurality of photoelectric sensor assemblies 012 of a same row of the photoelectric sensor assemblies 012 progressively decrease in the direction from the ends of the photoelectric sensitive regions to the center of the photoelectric sensitive regions, the photosensitive regions of the plurality of photoelectric sensor assemblies 012 may receive optical signals reflected via sections of eyes of the user of different areas, such that the optical signals, reflected via the eyes of the user, which are received by the photosensitive regions of the plurality of photoelectric sensor assemblies 012 correspond to the intensities of the optical signals reflected via the eyes of the user; thus, the accuracy of determining the gaze positions is further improved.

Optionally, a variation rule of the areas of photosensitive regions of the plurality of photoelectric sensor assemblies 012 may correspond to a curvature of a surface of an eye of the user.

In the embodiments of the present disclosure, referring to FIG. 2 to FIG. 5, in a same row of the photoelectric sensor assemblies 012, distances between any two adjacent photoelectric sensor assemblies 012 are equal.

Figure 6:
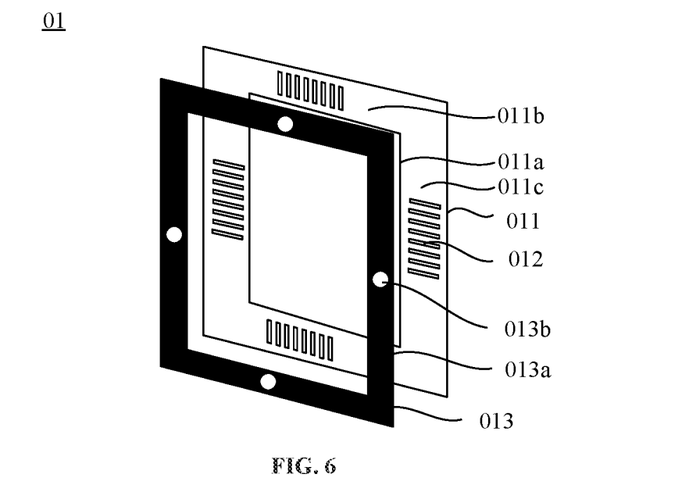
FIG. 6 is a schematic structural diagram of still another display device according to an embodiment of the present disclosure.

In the embodiments of the present disclosure, referring to FIG. 6, FIG. 6 is a schematic structural diagram of still another display device according to an embodiment of the present disclosure. The display device 01 may further include an optical structure 013 disposed on a side, distal from the display panel 011, of the photoelectric sensor assembly 012. The optical structure 013 is provided with a light shielding region 013a, and a plurality of light transmitting regions 013b corresponding to the first region 011b and the second region 011c, wherein an orthographic projection of each of the light transmitting region 013b on the display panel 011 is within a corresponding first region 011b or a corresponding second region 011c.

Each of the photoelectric sensor assemblies 012 is configured to receive an optical signal reflected via the eyes of the user and transmitted through the light transmitting region 013b in the optical structure 013, and convert the optical signal into an electric signal. In this way, the photoelectric sensor assembly 012 only receives light reflected via the eyes of the user, effectively improving the accuracy of the display device 01 in determining the gaze position of the eyes of the user on the display panel 011.

Optionally, the light transmitting region 013b in the optical structure 013 may be circular or slit-shaped.

In the embodiments of the present disclosure, referring to FIG. 2 to FIG. 5, the first direction X is perpendicular to the second direction Y. The first direction X may be in a direction of a pixel row of the display panel 011, and the second direction Y may be in a direction of a pixel column of the display panel 011. The display panel 011 may include two first regions 011b and two second regions 011c. The two first regions 011b may be arranged along the second direction Y, and respectively disposed on two sides of the display region 011a. The two second regions 011c may be arranged along the first direction X, and respectively disposed on the two sides of the display region 0111a. In this way, the display device 01 is capable of determining the gaze position of the eyes of the user on the display panel 01 based on the photoelectric sensor assemblies 012 within the two first regions 011b and the photoelectric sensor assemblies 012 within the two second regions 011c; and thus the accuracy of determining the gaze positions is improved.

Figure 7:
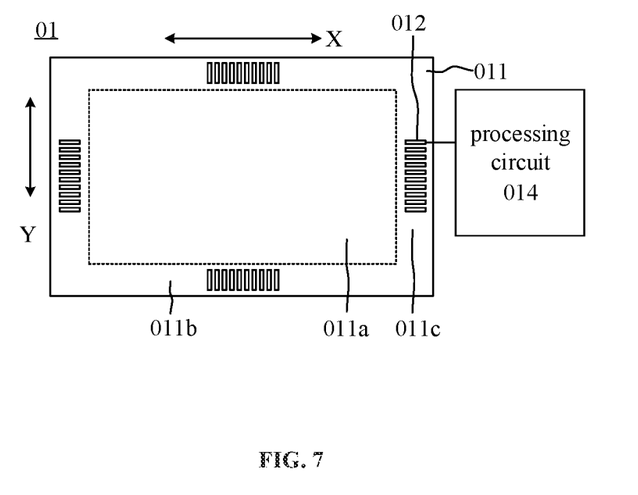
FIG. 7 is a schematic structural diagram of still another display device according to an embodiment of the present disclosure.

In the embodiments of the present disclosure, referring to FIG. 7, FIG. 7 is a schematic structural diagram of still another display device according to an embodiment of the present disclosure. The display device 01 may further include a processing circuit 014. The processing circuit 014 is connected to each of the photoelectric sensor assemblies 012 and is configured to determine the gaze position of the eyes of the user on the display panel 011 based on a signal value of the electric signal transmitted by each of the photoelectric sensor assemblies 012, positions of the photoelectric sensor assemblies 012 within the first region 011b, and positions of the photoelectric sensor assemblies 012 within the second region 011c.

In the embodiments of the present disclosure, the processing circuit 014 may receive an electric signal transmitted by each of the plurality of photoelectric sensor assemblies 012 within the first region 011b, and determine at least one target first photoelectric sensor assembly. The processing circuit 014 may receive an electric signal transmitted by each of the plurality of photoelectric sensor assemblies 012 within the second region 011c and determine at least one target second photoelectric sensor assembly. Finally, the processing circuit 014 may determine the gaze position of the eyes of the user on the display panel 011 based on a position of the at least one target first photoelectric sensor assembly and a position of the at least one target second photoelectric sensor assembly.

A signal value of an electric signal transmitted by the target first photoelectric sensor assembly may be less than or equal to a first threshold, and a signal value of an electric signal transmitted by the target second photoelectric sensor assembly may be less than or equal to a second threshold. The first threshold may be equal to or not equal to the second threshold, which is not limited herein.

The eye of the user includes a pupil, a sclera, and an iris. The gaze position of the eyes of the user on the display panel 011 is a gaze positions of the pupil on the display panel 011. Due to the deepest color of the pupil, an optical signal reflected via the pupil is the minimum. Furthermore, an electric signal converted from the optical signal reflected via the pupil is the minimum. In this way, based on the signal value of the electric signal transmitted by the target first photoelectric sensor assembly that is less than or equal to the first threshold and the signal value of the electric signal transmitted by the target second photoelectric sensor assembly that is less than or equal to the second threshold, the gaze position of the pupil of the eye of the user on the display panel 011 may be determined.

Optionally, the first threshold and the second threshold may be fixed values pre-stored in the processing circuit 014. Alternatively, the first threshold may be determined, by the processing circuit 014, based on the received signal values of electric signals transmitted by the plurality of photoelectric sensor assemblies 012 within the first region 011b. The second threshold may be determined, by the processing circuit 014, based on the received signal values of electric signals transmitted by the plurality of photoelectric sensor assemblies 012 within the second region 011c.

For example, the processing circuit 014 may rank signal values of N electric signals transmitted by N photoelectric sensor assemblies 012 that are within the first region 011b in an ascending order, and determine a signal value in the $n^{th}$ position as the first threshold. N is an integer greater than 1, and n is an integer greater than 1 and less than N/2. The processing circuit 014 may rank signal values of M electric signals transmitted by M photoelectric sensor assemblies 012 that are within a second detection region A1 in the ascending order, and determine a signal value in the mth position as the second threshold. M is an integer greater than 1, and m is an integer greater than 1 and less than M/2.

Optionally, the processing circuit 014 determines a minimum of signal values of the received electric signals of the plurality of photoelectric sensor assemblies 012 within the first region 011b as the first threshold, and the processing circuit 014 determines a minimum of signal values of the received electric signals of the plurality of photoelectric sensor assemblies 012 within the second detection region A1 as the second threshold.

In the embodiments of the present disclosure, the processing circuit 014 may determine first coordinate values of a target first photoelectric sensor assembly, transmitting the electric signal with the minimum signal value, in the photoelectric sensor assemblies 012 within the first region 011b. The processing circuit 014 may determine second coordinate values of a target first photoelectric sensor assembly, transmitting the electric signal with the minimum signal value, in the photoelectric sensor assemblies 012 within the second region 011c. The processing circuit 014 may determine the gaze position of the eyes of the user on the display panel 0111 based on the first coordinate values and the second coordinate values.

Figure 8:
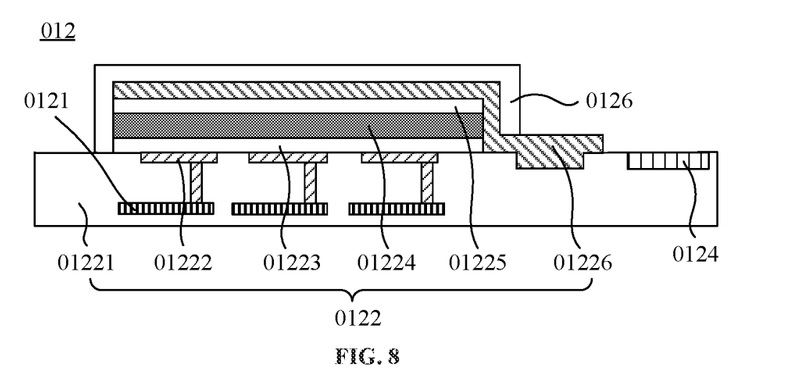
FIG. 8 is a schematic structural diagram of a photoelectric sensor assembly according to an embodiment of the present disclosure.

In the embodiments of the present disclosure, the display device 01 may further include a control circuit. FIG. 8 is a schematic structural diagram of a photoelectric sensor assembly according to an embodiment of the present disclosure. Referring to FIG. 8, the photoelectric sensor assembly 012 may include a switch transistor 0121 and a photodiode 0122.

Optionally, the photodiode 0122 may be a hydrogenated amorphous silicon diode or an organic photodiodes diode (OPD). A response of the organic photodiodes diode to the infrared light is better than a response of the hydrogenated amorphous silicon diode to the infrared light.

The embodiments of the present disclosure take a scenario where the photodiode 0122 is the organic photodiodes diode as an example. Referring to FIG. 8, the photodiode 0122 includes: a substrate 01221, and a pixel electrode 01222, a P-type material layer 01223, a photosensitive material layer 01224, an N-type material layer 01225, and a common electrode 01226 that are disposed on a side of the substrate 01221, and are successively stacked along a direction away from the substrate 01221.

Figure 9:
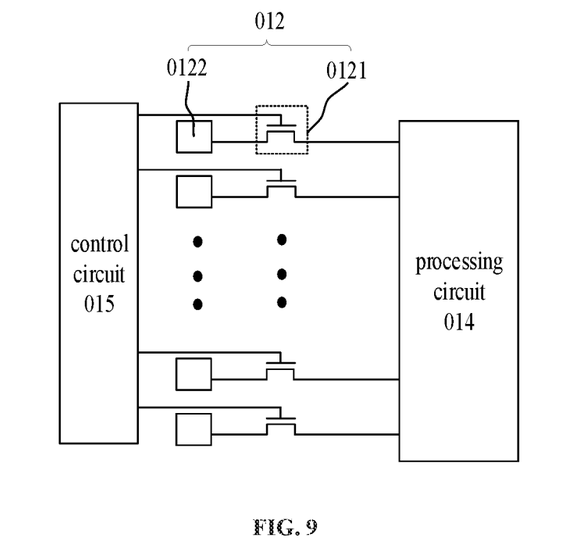
FIG. 9 is a schematic diagram of a photoelectric sensor assembly, a processing circuit, and a control circuit according to an embodiment of the present disclosure.

Referring to FIG. 9. FIG. 9 is a schematic diagram of a photoelectric sensor assembly, a processing circuit, and a control circuit according to an embodiment of the present disclosure. A first electrode of the switch transistor 0121 is electrically connected to the pixel electrode 01222, a second electrode of the switch transistor 0121 is electrically connected to the processing circuit 014, a control electrode of the switch transistor 0121 is electrically connected to the control circuit 015, and the control circuit 015 is configured to control on and off of the switch transistor 0121. FIG. 9 only shows that the first electrode of the switch transistor 0121 is electrically connected to the pixel electrode 01222, and does not show that the switch transistor 0121 is electrically connected to the processing circuit 014 and the control circuit 015.

In the embodiments of the present disclosure, the display panel 011 may be an LCD display panel. The liquid crystal display panel includes an array substrate, a color filter substrate, and a liquid crystal layer disposed between the array substrate and the color filter substrate. In general, an orthographic projection of the color filter substrate on the array substrate and an orthographic projection of the liquid crystal layer on the array substrate are both within the array substrate, and the array substrate includes a region that is not overlapped with the color filter substrate and the liquid crystal layer.

In some embodiments, the display panel 011 further may be an OLED display panel or a LED display panel, and a type of the display panel 011 is not limited herein. In the case that the display panel 011 011 is the OLED display panel or the LED display panel, the switch transistor 0121 of the photoelectric sensor assembly 012 only needs to be disposed in the first region 011*b* of the display panel 011.

Optionally, the switch transistor 0121 of the photoelectric sensor assembly 012 may be an amorphous silicon (a-Si) thin film transistor, a low temperature poly-silicon (LTPS) thin film transistor, or an oxide thin film transistor.

In the embodiments of the present disclosure, the photoelectric sensor assembly 012 include the switch transistor 0121 and the photodiode 0122, and the switch transistor 0122 may be integrated into the display panel 011 or may be disposed in a flexible circuit board attached to the display panel 011. An arrangement of the switch transistors 0121 is not fixed, and therefore, the arrangements of the plurality of photoelectric sensor assemblies 012 generally refer to arrangements of the photodiodes 0122 in the plurality of photoelectric sensor assemblies 012.

For example, that the plurality of photoelectric sensor assemblies 012 are arranged along the first direction X may mean that: the photodiodes 0122 in the plurality of photoelectric sensor assemblies 012 are arranged along the first direction X. That the plurality of photoelectric sensor assemblies 012 are arranged along the second direction Y may mean that: the photodiodes 0122 in the plurality of photoelectric sensor assemblies 012 are arranged along the second direction Y.

In summary, the embodiments of the present disclosure provide a display device. Because the display device has a high efficiency in processing the electric signal transmitted by each of the photoelectric sensor assemblies, the display device is capable of quickly determining the gaze position of the eyes of the user on the display panel based on the electric signal transmitted by each of the photoelectric sensor assemblies. In this way, the efficiency of displaying the images by the display panel is further improved, and thus a higher refresh rate of the display panel is achieved.

Figure 10:
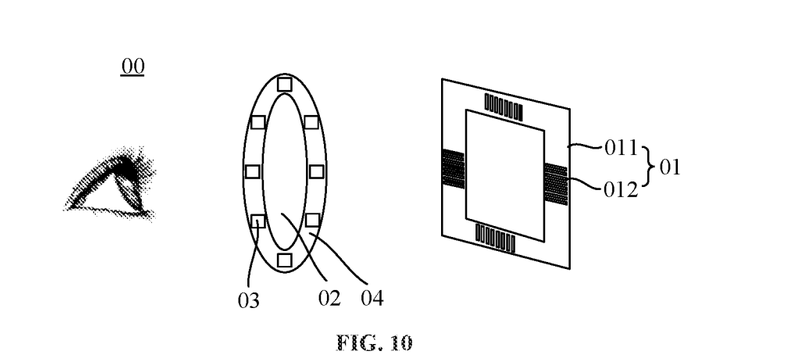
FIG. 10 is a schematic structural diagram of a wearable display panel according to an embodiment of the present disclosure.

FIG. 10 is a schematic structural diagram of a wearable display panel according to an embodiment of the present disclosure. Referring to FIG. 10, the wearable display device 00 may include: the display device 01 as described above, a lens 02 disposed on a display side of the display device 01, and a plurality of light-emitting elements 03 disposed on an edge of the lens 02. Emitting directions of the plurality of light-emitting elements 03 face away from the display device 01.

In the embodiments of the present disclosure, light emitted by each of the light-emitting elements 03 may be irradiated to the eyes of the user, and may be irradiated to the photoelectric sensor assembly 012 upon being reflected via the eyes of the user. In this way, the photoelectric sensor assembly 012 receives the optical signal reflected via the eyes of the user.

Referring to FIG. 10, the wearable display device 00 further includes a lens frame 04. The lens frame 04 is disposed on the edge of the lens 02 to fix the lens 02. The plurality of light-emitting elements 03 may be fixed on side, distal from the display panel 011, of the lens frame 04.

Optionally, the plurality of light-emitting elements 03 may be arranged evenly on the side, distal from the display panel 011, of the lens frame 04, such that a uniformity of the light irradiated to the eyes of the user is ensured, and the accuracy of the display device 01 to determine the gaze position of the eyes of the user on the display panel 011 based on the electric signal transmitted by each of the photoelectric sensor assemblies 012 is ensured.

Optionally, the plurality of light-emitting elements 03 are infrared light-emitting diodes. Because reflectivities of a pupil, a sclera, and an iris of the eye of the user against infrared light are greatly different, by designing the light-emitting element 03 as the infrared light-emitting diode, an optical signal, reflected via the pupil, of the infrared light, an optical signal, reflected via the sclera, of the infrared light, and an optical signal, reflected via the iris, of the infrared light that are received by the photoelectric sensor assembly 012 are greatly different. In this way, it is convenient for the processing circuit 014 to determine the gaze position of the eyes of the user (the pupils) on the display panel 011.

In summary, the embodiments of the present disclosure provide a wearable display device. Because the display device of the wearable display device has a high efficiency in processing the electric signal transmitted by each of the photoelectric sensor assemblies, the display device is capable of quickly determining the gaze position of the eyes of the user on the display panel based on the electric signal transmitted by each of the photoelectric sensor assemblies. In this way, the efficiency of displaying the images by the display panel is further improved, and thus a higher refresh rate of the display panel is achieved.

Figure 11:
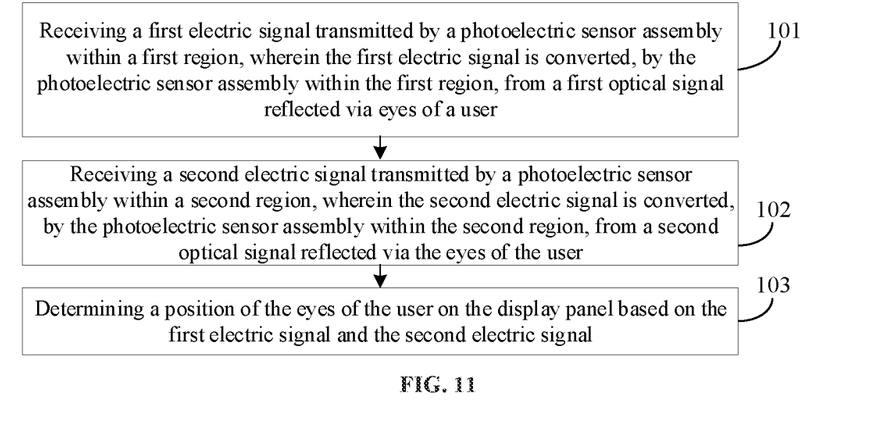
FIG. 11 is a flowchart of a method for determining gaze positions according to an embodiment of the present disclosure.

FIG. 11 is a flowchart of a method for determining gaze positions according to an embodiment of the present disclosure. The method may be applicable to the display device according to the embodiments described above. Referring to FIG. 11, the method may include the following steps.

In step 101, a first electric signal transmitted by a photoelectric sensor assembly within a first region is received, wherein the first electric signal is converted, by the photoelectric sensor assembly within the first region, from a first optical signal reflected via eyes of a user.

In the embodiments of the present disclosure, the display device 01 includes a display panel 011 and a plurality of photoelectric sensor assemblies 012. The display panel 011 includes a display region O1la. and a first region 011*b* disposed outside the display region O1la and extending along a first direction X. Each of the photoelectric sensor assemblies 012 is provided with a strip-shaped photosensitive region. One portion of the plurality of photoelectric sensor assemblies 012 are disposed in the first region 011*b*, and an extension direction of the photosensitive region is parallel to a second direction Y. Each of the photoelectric sensor assemblies 012 within the first region 011*b* is configured to receive the first optical signal reflected via the eyes of the user, and convert the first optical signal into the first electric signal.

In step 102, a second electric signal transmitted by a photoelectric sensor assembly within a second region is received, wherein the second electric signal is converted, by the photoelectric sensor assembly within the second region, from a second optical signal reflected via the eyes of the user.

In the embodiments of the present disclosure, the display device 01 includes the display panel 011 and the plurality of photoelectric sensor assemblies 012. The display panel 011 includes the second region 011c disposed outside the display region 011a and extending along the second direction Y. The other portion of the plurality of photoelectric sensor assemblies 012 are disposed in the second region 011c, and an extension direction of the photosensitive region is parallel to the first direction X. Each of the photoelectric sensor assemblies 012 within the second region 011c is configured to receive the second optical signal reflected via the eyes of the user, and convert the second optical signal into the second electric signal.

In step 103, a gaze position of the eyes of the user on the display panel is determined based on the first electric signal and the second electric signal.

In the embodiments of the present disclosure, the display device 01 may receive the electric signal transmitted by each of the photoelectric sensor assemblies 012. In the case that the display device 01 receives the electric signal transmitted by each of the photoelectric sensor assemblies 012, the display device 01 may determine the gaze position of the eyes of the user on the display panel 011 based on the first electric signal and the second electric signal.

In the embodiments of the present disclosure, positions of the photoelectric sensor assemblies 012 may be pre-stored in the display device 01. Because different regions of human eyes are different in reflectivity to light (e.g., infrared light), the optical signals, reflected via different regions of the human eyes, which are received by the photoelectric sensor assemblies 012 are different. Signal values of electric signals, converted by the photoelectric sensor assembly 012 based on different optical signals, are different. In this way, the display device 01 may determine the gaze position of the eyes of the user on the display panel 011 based on a signal value of the first electric signal, a signal of the second electric signal, and the position of the photoelectric sensor assembly 012.

In general, a data amount of the electric signals is less, and a data amount of images is more. Therefore, an efficiency of the display device 01 in processing the electric signals is higher than an efficiency of the display device 01 in processing the images. In the embodiments of the present disclosure, the display device 01 has a high efficiency in processing the electric signal transmitted by each of the photoelectric sensor assemblies 012, and is thus capable of quickly determining the gaze position of the eyes of the user on the display panel 011. In this way, the efficiency of displaying the images by the display panel 011 is further improved, and thus a higher refresh rate of the display panel 011 is achieved.

Furthermore, because the plurality of photoelectric sensor assemblies 012 are within the first region 011b of the display panel 011, normal display of the display panel 011 may not be affected by the plurality of photoelectric sensor assemblies 012, and the display effect of the display panel 011 is great.

In summary, the embodiments of the present disclosure provide a method for determining gaze positions. Because the display device has the efficiency in processing the electric signal transmitted by each of the photoelectric sensor assemblies is high, the display device is capable of quickly determining the gaze position of the eyes of the user on the display panel based on the electric signal transmitted by each of the photoelectric sensor assemblies. In this way, the efficiency of displaying the images by the display panel is further improved, and thus the higher refresh rate of the display panel is achieved.

The embodiments of the present disclosure provide a non-transitory computer-readable storage medium. The non-transitory computer-readable storage medium stores one or more instructions, wherein the one or more instructions, when executed by the display device, cause the display device to perform the method for determining gaze positions as described above.

The technical solutions according to the embodiments of the present disclosure achieve at least the following beneficial effects.

The embodiments of the present disclosure provide a display device, a wearable display device and a method for determining gaze positions. Because the display device has a high efficiency in processing the electric signal transmitted by each of the photoelectric sensor assemblies, the display device may quickly determine the gaze position of the eyes of the user on the display panel based on the electric signal transmitted by each of the photoelectric sensor assemblies. In this way, the efficiency of displaying images by the display device is further improved, and thus a higher refresh rate of the display panel is achieved.

Described above are merely optional embodiments of the present disclosure, and are not intended to limit the present disclosure. Any modifications, equivalent substitutions, improvements, and the like may be made within the protection scope of the present disclosure, without departing from the spirit and principles of the present disclosure.

What is claimed is:

1. A display device, comprising:
    a display panel, comprising a display region, a first region disposed outside the display region and extending along a first direction, and a second region disposed outside the display region and extending along a second direction, wherein the first direction is intersected with the second direction; and
    a plurality of photoelectric sensor assemblies, each of the photoelectric sensor assemblies being provided with a strip-shaped photosensitive region; wherein one portion of the plurality of photoelectric sensor assemblies are disposed in the first region, extension directions of the photosensitive regions of the portion of the photoelectric sensor assemblies being parallel to the second direction; the other portion of the photoelectric sensor assemblies are disposed in the second region, extension directions of the photosensitive regions of the other portion of the photoelectric sensor assemblies being parallel to the first direction; and each of the photoelectric sensor assemblies is configured to receive an optical signal reflected via eyes of a user and convert the optical signal into an electric signal,
    wherein the photoelectric sensor assemblies are arranged in two rows in each of the first region and the second region along a direction away from the display region, and the two rows of photoelectric sensor assemblies are staggered.

2. The display device according to claim 1, wherein the photoelectric sensor assemblies within the first region and the second region are arranged in rows.

3. The display device according to claim 1, wherein in the two rows of photoelectric sensor assemblies, a length of a photosensitive region of a first photoelectric sensor assembly is greater than a length of a photosensitive region of a second photoelectric sensor assembly, wherein the first photoelectric sensor assembly is any one of a row, distal from the display region, of photoelectric sensor assemblies, and the second photoelectric sensor assembly is any one of a row, proximal to the display region, of photoelectric sensor assemblies.

4. The display device according to claim 3, wherein a ratio of the length of the photosensitive region of the first photoelectric sensor assembly to the length of the photosensitive region of the second photoelectric sensor assembly ranges from 1.1 to 2.

5. The display device according to claim 1, wherein the photosensitive region of each of the photoelectric sensor assemblies is trapezoidal;
wherein in the two rows of photoelectric sensor assemblies, an upper base of a photosensitive region of any one of the row, distal from the display region, of photoelectric sensor assemblies is collinear with an upper base of a photosensitive region of any one of the row, proximal to the display region, of photoelectric sensor assemblies.

6. The display device according to claim 2, wherein the photosensitive region of each of the photoelectric sensor assemblies is rectangular.

7. The display device according to claim 2, wherein in a same row of the photoelectric sensor assemblies, areas of the photosensitive regions of the plurality of photoelectric sensor assemblies progressively decrease in a direction from both ends to a center.

8. The display device according to claim 2, wherein in a same row of the photoelectric sensor assemblies, areas of the photosensitive regions of the photoelectric sensor assemblies are equal.

9. The display device according to claim 2, wherein in a same row of the photoelectric sensor assemblies, distances between any two adjacent photoelectric sensor assemblies are equal.

10. The display device according to claim 1, further comprising: an optical structure disposed on a side, distal from the display panel, of the photoelectric sensor assembly, wherein the optical structure comprises a light shielding region, and a plurality of light transmitting regions corresponding to the first region and the second region, an orthographic projection of each of the light transmitting regions on the display panel being within a corresponding first region or a corresponding second region;
wherein each of the photoelectric sensor assemblies is configured to receive the optical signal reflected via the eyes of the user and transmitted through the light transmitting region in the optical structure, and convert the optical signal into the electric signal.

11. The display device according to claim 1, further comprising: a processing circuit connected to each of the photoelectric sensor assemblies, wherein the processing circuit is configured to determine gaze positions of the eyes of the user on the display panel based on a signal value of the electric signal transmitted by each of the photoelectric sensor assemblies, a position of the photoelectric sensor assembly within the first region, and a position of the photoelectric sensor assembly within the second region.

12. The display device according to claim 11, further comprising: a control circuit; wherein each of the photoelectric sensor assemblies comprises: a switch transistor and a photodiode;
wherein the photodiode comprises: a substrate, and a pixel electrode, a P-type material layer, a photosensitive material layer, an N-type material layer, and a common electrode that are disposed on a side of the substrate, and are successively stacked along a direction away from the substrate;
wherein a first electrode of the switch transistor is electrically connected to the pixel electrode, a second electrode of the switch transistor is electrically connected to the processing circuit, a control electrode of the switch transistor is electrically connected to the control circuit, and the control circuit is configured to control on and off of the switch transistor.

13. A wearable display device, comprising: a display device, a lens disposed on a display side of the display device, and a plurality of light-emitting elements disposed on an edge of the lens; wherein
the display device comprises:
a display panel, comprising a display region, a first region disposed outside the display region and extending along a first direction, and a second region disposed outside the display region and extending along a second direction, wherein the first direction is intersected with the second direction; and
a plurality of photoelectric sensor assemblies, each of the photoelectric sensor assemblies being provided with a strip-shaped photosensitive region; wherein one portion of the plurality of photoelectric sensor assemblies are disposed in the first region, extension directions of the photosensitive regions of the portion of the photoelectric sensor assemblies being parallel to the second direction; the other portion of the photoelectric sensor assemblies are disposed in the second region, extension directions of the photosensitive regions of the other portion of the photoelectric sensor assemblies being parallel to the first direction; and each of the photoelectric sensor assemblies is configured to receive an optical signal reflected via eyes of a user and convert the optical signal into an electric signal; and
emitting directions of the plurality of light-emitting elements face away from the display device,
wherein the photoelectric sensor assemblies are arranged in two rows in each of the first region and the second region along a direction away from the display region, and the two rows of photoelectric sensor assemblies are staggered.

14. A method for determining gaze positions, applicable to a display device, wherein the display device comprises:
a display panel, comprising a display region, a first region disposed outside the display region and extending along a first direction, and a second region disposed outside the display region and extending along a second direction, wherein the first direction is intersected with the second direction; and
a plurality of photoelectric sensor assemblies, each of the photoelectric sensor assemblies being provided with a strip-shaped photosensitive region; wherein one portion of the plurality of photoelectric sensor assemblies are disposed in the first region, extension directions of the photosensitive regions of the portion of the photoelectric sensor assemblies being parallel to the second direction; the other portion of the photoelectric sensor assemblies are disposed in the second region, extension directions of the photosensitive regions of the other portion of the photoelectric sensor assemblies being parallel to the first direction; and each of the photoelectric sensor assemblies is configured to receive an optical signal reflected via eyes of a user and convert the optical signal into an electric signal; and the method comprises:

receiving a first electric signal transmitted by the photoelectric sensor assembly within the first region, wherein the first electric signal is converted, by the photoelectric sensor assembly within the first region, from a first optical signal reflected via eyes of a user;

receiving a second electric signal transmitted by the photoelectric sensor assembly within the second region, wherein the second electric signal is converted, by the photoelectric sensor assembly within the second region, from a second optical signal reflected via the eyes of the user; and determining a gaze position of the eyes of the user on a display panel based on the first electric signal and the second electric signal, wherein the photoelectric sensor assemblies are arranged in two rows in each of the first region and the second region along a direction away from the display region, and the two rows of photoelectric sensor assemblies are staggered.

15. The wearable display device according to claim 13, wherein the photoelectric sensor assemblies within the first region and the second region are arranged in rows.

16. The wearable display device according to claim 14, wherein in the two rows of photoelectric sensor assemblies, a length of a photosensitive region of a first photoelectric sensor assembly is greater than a length of a photosensitive region of a second photoelectric sensor assembly, wherein the first photoelectric sensor assembly is any one of a row, distal from the display region, of photoelectric sensor assemblies, and the second photoelectric sensor assembly is any one of a row, proximal to the display region, of photoelectric sensor assemblies.

17. The wearable display device according to claim 16, wherein a ratio of the length of the photosensitive region of the first photoelectric sensor assembly to the length of the photosensitive region of the second photoelectric sensor assembly ranges from 1.1 to 2.

18. The wearable display device according to claim 14, wherein the photosensitive region of each of the photoelectric sensor assemblies is trapezoidal;

wherein in the two rows of photoelectric sensor assemblies, an upper base of a photosensitive region of any one of the row, distal from the display region, of photoelectric sensor assemblies is collinear with an upper base of a photosensitive region of any one of the row, proximal to the display region, of photoelectric sensor assemblies.

* * * * *